(12) United States Patent
Warton et al.

(10) Patent No.: US 12,522,373 B2
(45) Date of Patent: Jan. 13, 2026

(54) SYSTEM FOR AIDING FORMATION FLYING OF AIRCRAFT

(71) Applicant: Airbus (S.A.S.), Blagnac (FR)

(72) Inventors: Nicolas Warton, Blagnac (FR); Jordan Lee Adams, Blagnac (FR); Julio Hernanz Gonzalez, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 540 days.

(21) Appl. No.: 17/852,000

(22) Filed: Jun. 28, 2022

(65) Prior Publication Data

US 2023/0002070 A1 Jan. 5, 2023

(30) Foreign Application Priority Data

Jul. 1, 2021 (FR) ..................... 2107156

(51) Int. Cl.
   *B64D 45/00* (2006.01)
   *G05D 1/00* (2024.01)

(52) U.S. Cl.
   CPC ............. *B64D 45/00* (2013.01); *G05D 1/104* (2013.01); *G05D 1/106* (2019.05)

(58) Field of Classification Search
   CPC ......... B64D 45/00; G05D 1/106; G05D 1/104
   USPC ........................................................... 701/9
   See application file for complete search history.

(56) References Cited

U.S. PATENT DOCUMENTS

| | | | | |
|---|---|---|---|---|
| 5,541,591 | A * | 7/1996 | Bush | G05D 1/0615 340/963 |
| 6,507,776 | B1 * | 1/2003 | Fox, III | G05D 1/0055 244/76 R |
| 10,908,277 | B1 * | 2/2021 | Roggendorf | G01S 13/953 |
| 2008/0030375 | A1 | 2/2008 | Cotton et al. | |

(Continued)

FOREIGN PATENT DOCUMENTS

WO WO 2015/160945 A1 10/2015

OTHER PUBLICATIONS

Hanson, et al., "Experimental Measurements of Passenger Ride Quality During Aircraft Wake Surfing," NASA, 2018 Atmospheric Flight Mechanics Conference, 2018, <https://arc.aiaa.org/doi/pdf/10.2514/6.2018-3561> (Year: 2018).*

(Continued)

*Primary Examiner* — Tiffany P Young
*Assistant Examiner* — Karen Lynelle Furgason
(74) *Attorney, Agent, or Firm* — KDW Firm PLLC

(57) ABSTRACT

A system for aiding formation flying of a follower aircraft with respect to a wake vortex from a leader aircraft comprises a controller and at least one accelerometer installed on the follower aircraft. The controller receives acceleration measurements performed by the at least one accelerometer and processes the measurements to obtain a value representative of vibrations generated by the wake vortex from the leader aircraft. The controller compares the value with at least one predetermined threshold representative of excessive vibrations with regard to location of the at least one accelerometer on the follower aircraft. One or more notifi- (Continued)

cations, such as alerts, are generated based on the result of the comparison. It is easier to position the follower aircraft in formation flying to benefit from a rising airflow phenomenon brought about by the wake vortex from the leader aircraft.

13 Claims, 5 Drawing Sheets

(56) References Cited

U.S. PATENT DOCUMENTS

| | | | | |
|---|---|---|---|---|
| 2008/0234933 | A1* | 9/2008 | Chowdhary | G01C 21/12 701/479 |
| 2016/0200420 | A1* | 7/2016 | Mckenna | B64C 13/16 244/215 |
| 2017/0315564 | A1* | 11/2017 | Thomas | G08G 5/0078 |
| 2017/0334576 | A1* | 11/2017 | Shams | B64D 43/00 |
| 2019/0041875 | A1 | 2/2019 | Torralba et al. | |
| 2019/0310642 | A1 | 10/2019 | Robin et al. | |
| 2020/0334994 | A1* | 10/2020 | Jensen | G08G 5/0008 |
| 2020/0363560 | A1* | 11/2020 | Pritchard | G01W 1/00 |
| 2022/0390963 | A1* | 12/2022 | Takahashi | B64D 1/22 |

OTHER PUBLICATIONS

Chao, et al., "Wake Vortex Detection with UAV Close Formation Flight," Nasa, AAIA Atmospheric Flight Mechanics Conference, 2015, <https://arc.aiaa.org/doi/pdf/10.2514/6.2015-2396> (Year: 2015).*
French Search Report for Application No. 2107156 dated May 16, 2022.

* cited by examiner

SYSTEM FOR AIDING FORMATION FLYING OF AIRCRAFT

CROSS-REFERENCE TO RELATED APPLICATION

This application claims priority to French patent application number 2107156 filed on Jul. 1, 2021, the entire disclosure of which is incorporated by reference herein.

TECHNICAL FIELD

The disclosure herein relates to a system for aiding formation flying of aircraft. More particularly, the disclosure herein relates to a system for aiding the positioning of follower aircraft with respect to wake vortices from a leader aircraft during formation flying.

BACKGROUND

Wake vortices, also called wingtip vortices, are wake turbulence at the ends of the wings of a flying aircraft. Wake vortices may persist for several minutes after an aircraft has passed, and disrupt the trajectory of another aircraft passing nearby in the meantime. Safety distances between flying aircraft are applied by air traffic control (ATC) in order to take into account wake turbulence and avoid any flying difficulties linked to the existence thereof.

In formation, a leader aircraft is followed by one or more follower aircraft, which may experience wake vortices from the leader aircraft. However, by controlling their position with respect to the wake vortices, follower aircraft are able to benefit from a rising airflow phenomenon brought about by the wake vortices, thus reducing drag and fuel consumption. By contrast, if the follower aircraft enter the space between the wake vortices from the leader aircraft, the follower aircraft experience a falling airflow phenomenon that is brought about by the wake vortices and that impairs the performance and the stability of the aircraft. In particular, the proximity of the wake vortices leads to risks for the ongoing operations of the follower aircraft, such as: the follower aircraft may experience turbulence associated with the wake vortices, the engines of the follower aircraft may be exposed to high speed and pressure gradients, and the follower aircraft is more likely to unintentionally enter the space between the wake vortices from the leader aircraft.

In order to attenuate these risks, it is then desirable to provide a solution that makes it possible to assist a pilot of an aircraft flying in formation in the management of the positioning of his aircraft with respect to wake vortices generated by another aircraft moving in front.

SUMMARY

What is then proposed is a method implemented by a system for aiding formation flying of a follower aircraft with respect to a wake vortex from a leader aircraft, the system for aiding formation flying comprising a controller and at least one accelerometer installed on the follower aircraft, the method comprising the following steps, performed by the controller: receiving acceleration measurements performed by the at least one accelerometer; processing the received measurements so as to obtain therefrom a value representative of vibrations generated by the wake vortex from the leader aircraft; comparing the obtained value with a predetermined threshold representative of excessive vibrations with regard to the location of the at least one accelerometer on the follower aircraft; generating a notification when the comparison shows that the obtained value is greater than the predetermined threshold. It is thus made easier to position the follower aircraft in formation flying, in order to benefit from a rising airflow phenomenon brought about by the wake vortex from the leader aircraft.

Furthermore, the one or more accelerometers of the system for aiding formation flying are dedicated to this system, that is to say that these accelerometers are not intended to be used by another positioning system of the aircraft for formation flying. In other words, the one or more accelerometers of the system for aiding formation flying are independent of other positioning systems of the aircraft for formation flying. The system for aiding formation flying is thus independent of the information sources of a flight command management system, that is to say independent of formation flying control laws.

According to one particular embodiment, the controller performs the following steps: receiving acceleration measurements performed by the accelerometer; extracting, from the received acceleration measurements, a peak value over a time window of predefined duration; comparing the extracted peak value with the predetermined threshold; generating the notification when the comparison shows that the extracted peak value is greater than the predetermined threshold.

According to one particular embodiment, the controller performs the following steps: receiving acceleration measurements performed by the accelerometer; extracting, from the received acceleration measurements, a variance value over a time window; comparing the extracted variance value with the predetermined threshold; generating the notification when the comparison shows that the extracted variance value is greater than the predetermined threshold.

According to one particular embodiment, the controller performs the following steps: receiving first acceleration measurements performed by a first accelerometer located on one wing of the follower aircraft; extracting, from the received first acceleration measurements, a first variance value over a time window; receiving second acceleration measurements performed by a second accelerometer located on the other wing of the follower aircraft; extracting, from the received second acceleration measurements, a second variance value over the time window; determining a difference value between the first and second variance values; comparing the determined difference value with the predetermined threshold or another predetermined threshold; generating the notification when the comparison shows that the determined difference value is greater than the predetermined threshold or, respectively, than the other predetermined threshold.

And, according to one particular embodiment, each abovementioned variance value is a moving variance value.

According to one particular embodiment, the controller obtains information indicating whether the follower aircraft is located to the right or to the left of the leader aircraft.

According to one particular embodiment, when multiple accelerometers are installed on the follower aircraft, the controller obtains the information indicating whether the follower aircraft is located to the right or to the left of the leader aircraft by comparing measurements from the accelerometers with one another.

According to one particular embodiment, the notification is an order to activate a light-based and/or sound-based signal in the cockpit of the follower aircraft and/or a message sent to a flight command management system of the follower aircraft.

What is also proposed is a system for aiding formation flying of a follower aircraft with respect to a wake vortex from a leader aircraft, the system for aiding formation flying comprising a controller and at least one accelerometer installed on the follower aircraft, the system comprising electronic circuitry configured so as to: receive acceleration measurements performed by the at least one accelerometer; process the received measurements so as to obtain therefrom a value representative of vibrations generated by the wake vortex from the leader aircraft; compare the obtained value with a predetermined threshold representative of excessive vibrations with regard to the location of the at least one accelerometer on the follower aircraft; generate a notification when the comparison shows that the obtained value is greater than the predetermined threshold.

What is also proposed is an aircraft acting as follower in formation flying and that comprises a system for aiding formation flying as outlined above.

According to one particular embodiment, the aircraft comprises a flight command management system having at least one information source, the system for aiding formation flying being independent of the at least one information source of the flight command management system, the notification is a message sent to the flight command management system, and the flight command management system is configured so as to make adjustments to the trajectory of the follower aircraft based on the message.

BRIEF DESCRIPTION OF THE DRAWINGS

The features of the disclosure herein mentioned above, along with others, will become more clearly apparent on reading the following description of at least one example embodiment, the description being given with reference to the appended drawings, in which.

DETAILED DESCRIPTION

Figure 1:
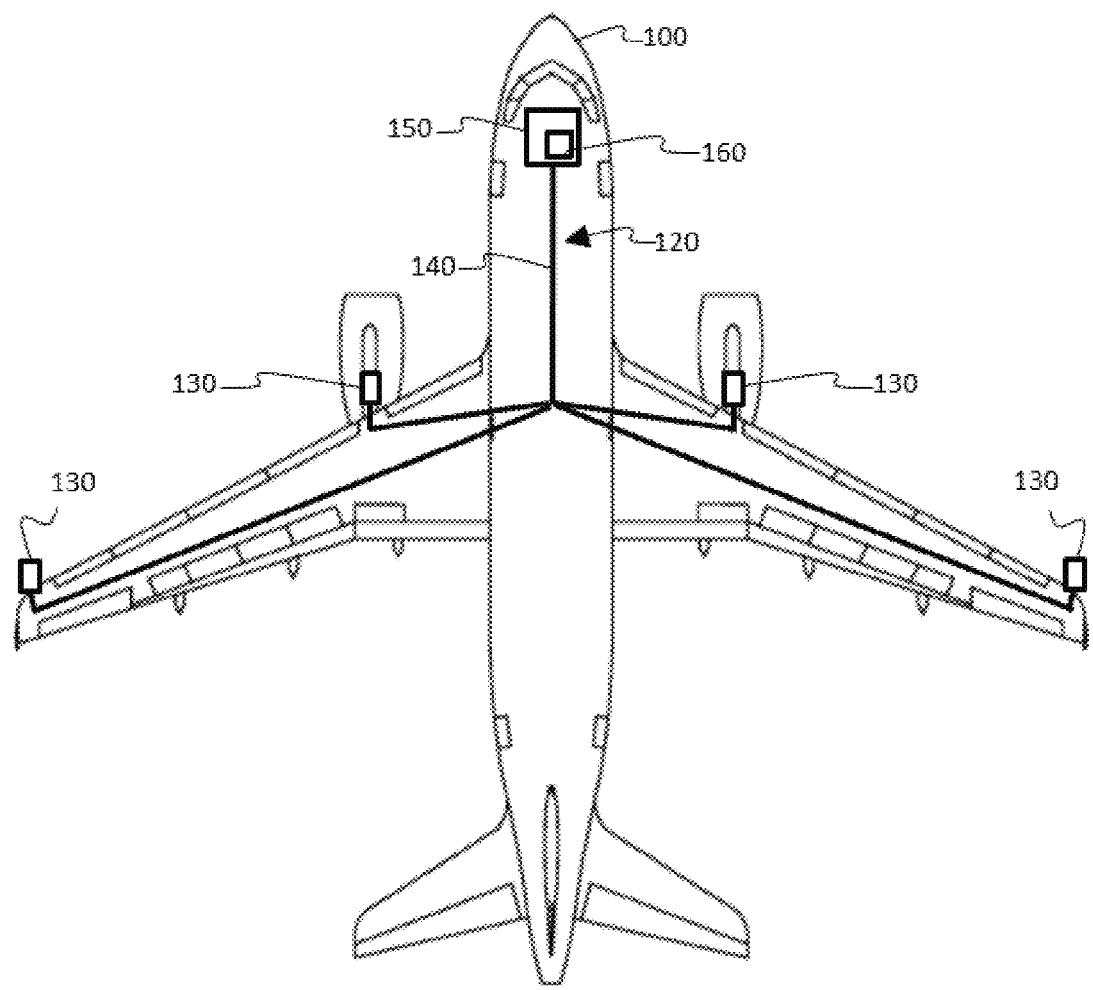
FIG. 1 schematically illustrates a plan view of an aircraft equipped with a system for aiding formation flying.

FIG. 1 schematically illustrates a plan view of an aircraft 100 equipped with a system 120 for aiding formation flying, more particularly when the aircraft 100 is a follower aircraft.

The system 120 comprises a controller 160. In one particular embodiment, the controller 160 is integrated into the avionics 150 of the aircraft 100.

The system 120 comprises at least one accelerometer 130 designed to perform vibration measurements. Each accelerometer 130 is connected to the controller 160 by a communication system, communication bus or communication network 140.

Preferably, the system 120 is detachable and is activated during phases of formation flying in which the aircraft 100 is a follower aircraft. For example, the system 120 is activated/deactivated upon command from a pilot of the aircraft 100.

Figure 2:
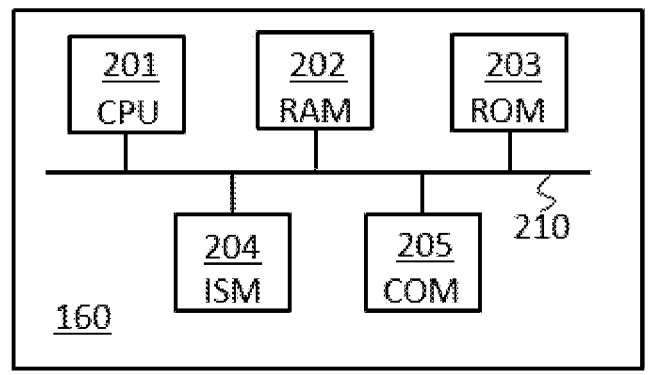
FIG. 2 schematically illustrates one example of a hardware architecture of a controller of the system for aiding formation flying.

FIG. 2 schematically illustrates one example of a hardware architecture of the controller 160.

The controller 160 then comprises the following, connected by a communication bus 210: a processor or CPU ("central processing unit") 201; a random access memory RAM 202; a read-only memory ROM 203, for example a flash memory; a data storage device, such as an HDD ("hard disk drive"), or a storage medium reader, such as an SD ("Secure Digital") card reader 204; at least one communication interface 205 allowing the controller 160 to interact more particularly with each accelerometer 130 and with other equipment of the aircraft 100, such as for example a flight command management system of the avionics 150.

The processor 201 is capable of executing instructions loaded into the RAM 202 from the ROM 203, from an external memory (not shown), from a storage medium, such as an SD card, or from a communication network (not shown). When the controller 160 is powered up, the processor 201 is capable of reading instructions from the RAM 202 and of executing them. These instructions form a computer program that causes the processor 201 to implement the behaviors, steps and algorithms described here.

All or some of the modular architectures, behaviors, steps and algorithms described here may thus be implemented in software form by executing a set of instructions by way of a programmable machine, such as a DSP ("digital signal processor") or a microcontroller, or be implemented in hardware form by way of a machine or a dedicated component ("chip") or a dedicated set of components ("chipset"), such as an FPGA ("field-programmable gate array") or an ASIC ("application-specific integrated circuit"). The controller 160, and more generally the system 120, therefore comprises electronic circuitry designed and configured so as to implement the modular architectures, behaviors, steps and algorithms described here.

Figure 3:
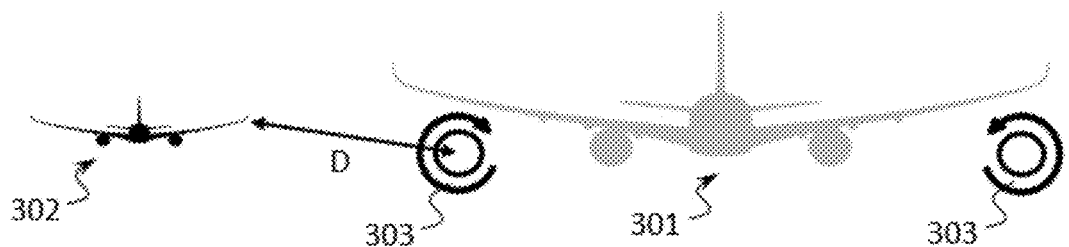
FIG. 3 schematically illustrates a position of a follower aircraft with respect to a leader aircraft during formation flying.

FIG. 3 schematically illustrates a position of a follower aircraft 302 with respect to a leader aircraft 301 during formation flying. The aircraft 301 and 302 are cruising. The movement of the leader aircraft 301 generates wake vortices (or wingtip vortices) 303. If the follower aircraft 302 stays at a distance D between a minimum threshold Dmin and a maximum threshold Dmax of the wake vortices outside the trajectory of the leader aircraft 301, the follower aircraft 302 benefits from a rising airflow phenomenon brought about by the wake vortices, thus reducing drag and fuel consumption for the follower aircraft 302.

The system 120 helps to keep the distance D above the minimum threshold Dmin during formation flying by analyzing accelerations measured by the one or more accelerometers 130. Specifically, the closer the follower aircraft 302 gets to the wake vortices from the leader aircraft 301, the more intense the vibrations, and the higher the acceleration measurements performed by the accelerometers 130. In addition, when the follower aircraft 302 has entered a wake vortex from the leader aircraft 301, the vibrations are even more intense, and the acceleration measurements performed by the accelerometers 130 are higher.

Figure 4:
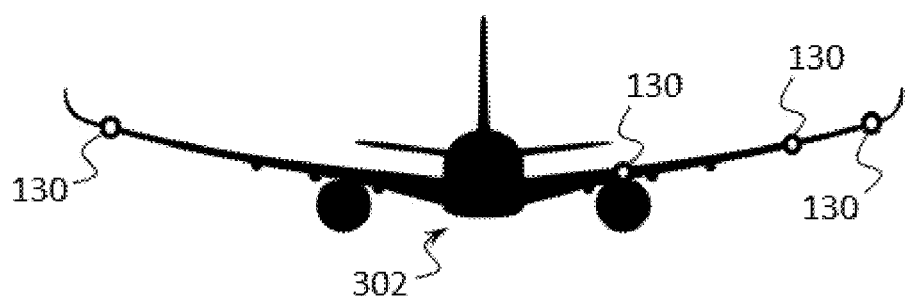
FIG. 4 schematically illustrates possible positions, on the follower aircraft, of accelerometers of the system for aiding formation flying.

FIG. 4 schematically illustrates possible positions, on the follower aircraft 302, of the accelerometers 130.

One or more accelerometers 130 are installed on the follower aircraft 302. One or more accelerometers 130 are preferably installed on one and/or the other of the wings of the follower aircraft 302 or on an element attached thereto (for example engine pylon). The flexibility of the structure of the wings aids the sensitivity of the accelerometers 130.

The fastening position of the accelerometer 130 could be: on the winglet, on the outer structure of the wing, on the rudders, the positions of which are static during cruising, on internal elements of the wing that are fastened to the structure of the follower aircraft 302 and immobile during flying (beyond vibrations experienced), on the engine pylon, or on the engine or in the nacelle. In one particular embodiment, the accelerometers 130 are installed on the front of the wings, so as to minimize the impact of turbulence brought about by the follower aircraft 302 itself.

As described below, installing at least one accelerometer 130 on each of the wings makes it possible to improve the ability to detect the proximity of a wake vortex.

In one preferred embodiment, a first accelerometer 130 is installed on one wingtip, and a second accelerometer 130 is installed on the other wingtip.

Figure 5:
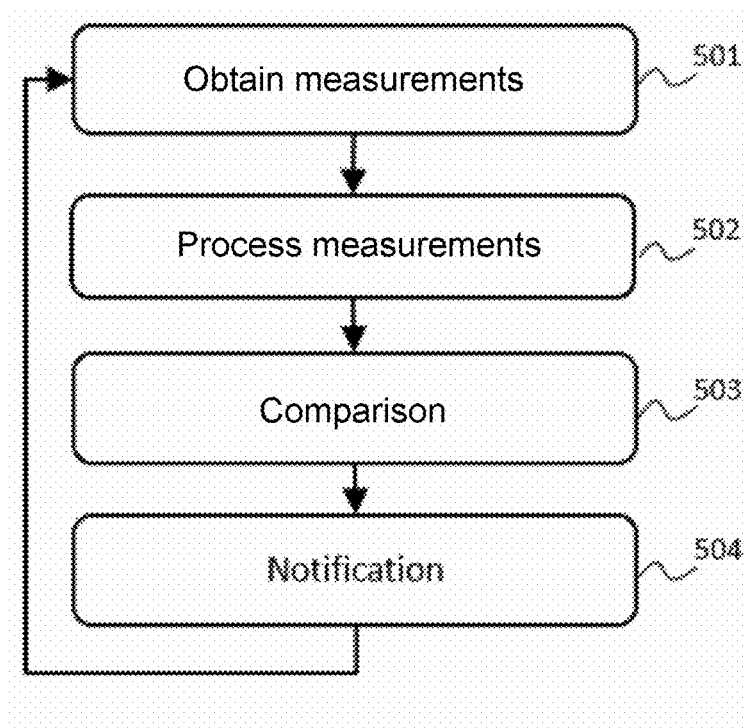
FIG. 5 schematically illustrates an algorithm for detecting excessive proximity of a wake vortex, according to a first embodiment.

FIG. 5 schematically illustrates an algorithm for detecting excessive proximity of a wake vortex based on measurements performed by at least one accelerometer 130.

In a step 501, the controller 160 obtains acceleration measurements from an accelerometer 130. The accelerometer 130 in question may be one accelerometer from among a plurality of accelerometers 130 installed on the aircraft. When multiple accelerometers 130 are installed on the follower aircraft 302, the controller 160 may, as a variant, obtain a combination of measurements, for example using a weighted average, from the accelerometers 130.

In one particular embodiment, the controller 160 obtains information indicating whether the follower aircraft 302 is located to the right or to the left of the leader aircraft 301. This information may be provided by the avionics 150, for example following a command or an input from instruments in the cockpit of the follower aircraft 302. Specifically, given that the vibrations perceived by the accelerometers 130 differ depending on whether the wake vortex from the leader aircraft 301 is to the right or to the left of the follower aircraft 302, this information makes it possible to adjust the analysis of the measurements from multiple accelerometers 130 (whether or not they are located on the same wing). Thus, for example, the weights of the abovementioned weighted average are adjusted based on the position of each accelerometer 130 on the follower aircraft 302 and based on the position (to the right or to the left) of the follower aircraft 302 with respect to the leader aircraft 301 in the formation. It may thus be taken into account that, the further an accelerometer 130 is from the assumed position of the wake vortices from the leader aircraft 301, the less intense the vibrations experienced. Likewise, the closer an accelerometer 130 is to a wingtip, the more intense the vibrations experienced, since the structure of the wing there is more flexible.

In one particular embodiment in which multiple accelerometers 130 are installed on the follower aircraft 302, the information indicating whether the follower aircraft 302 is located to the right or to the left of the leader aircraft 301 is determined automatically by the controller 160. Once the avionics 150 have activated the system 120, the controller 160 compares the measurements from the accelerometers 130 and deduces, from the location of the accelerometers 130 on the aircraft 302, whether the follower aircraft 302 is located to the right or to the left of the leader aircraft 301 (on the side where the vibrations, and therefore the measured accelerations, are greatest).

In a step 502, the controller 160 processes the measurements received in step 501 so as to obtain therefrom a value representative of vibrations generated by a wake vortex from the leader aircraft 301. In one particular embodiment, the controller 160 determines a peak absolute value, or an average value, or standard deviation value or variance value, or a power spectral density, over a time window. In one particular embodiment, the controller 160 applies a filter, for example a noise suppression filter or interference suppression filter, to the measurements received in step 501.

In a step 503, the controller 160 compares the value obtained in step 502 with a predetermined first threshold representative of excessive vibrations with regard to the location of the accelerometers on the follower aircraft 302. For example, this first threshold is predefined and fixed in accordance with measurement readings taken during full-scale tests or in simulations. This predetermined first threshold is representative of the fact that the follower aircraft 302 is approaching the wake vortex from the leader aircraft 301, at a distance D less than the threshold Dmax.

According to one configuration, in a step 503, the controller 160 compares the value obtained in step 502 with a predetermined second threshold representative of excessive vibrations with regard to the location of the accelerometers on the follower aircraft 302. The predetermined second threshold is greater than the predetermined first threshold. For example, this second threshold is predefined and fixed in accordance with measurement readings taken during full-scale tests or in simulations. This predetermined second threshold is representative of the fact that the follower aircraft 302 has entered the wake vortex from the leader aircraft 301, at a distance D less than the threshold Dmin.

In a step 504, the controller 160 gives a notification based on the result of the comparison in step 503. This notification is for example an order to activate a light-based and/or sound-based signal in the cockpit of the follower aircraft 302. This notification is for example a message sent to the flight command management system of the avionics 150, in order to allow the flight command management system to make a trajectory adjustment (in the opposite direction to the position of the wake vortex).

The controller 160 may be configured so as to give such a notification when the comparison shows that the value obtained in step 502 is greater than the predetermined first threshold. The controller 160 may on the other hand be configured so as to give such a notification when the comparison shows that the value obtained in step 502 is less than or equal to the predetermined first threshold.

According to one configuration, the controller 160 may be configured so as to give such a notification when the comparison shows that the value obtained in step 502 is greater than the predetermined second threshold. The controller 160 may on the other hand be configured so as to give such a notification when the comparison shows that the value obtained in step 502 is less than or equal to the predetermined second threshold. According to another configuration, the controller 160 may be configured so as to give such a notification when the comparison shows that the value obtained in step 502 is greater than the predetermined first threshold and less than or equal to the predetermined second threshold.

The controller 160 may thus give a first notification when the comparison shows that the value obtained in step 502 is greater than the predetermined first threshold (and less than the predetermined second threshold). This first notification indicates that the follower aircraft 302 is approaching the wake vortex from the leader aircraft 301 (follower aircraft 302 at a distance D less than the threshold Dmax). And, the controller 160 may give a second notification when the comparison shows that the value obtained in step 502 is greater than the predetermined second threshold (follower aircraft 302 at a distance D less than the threshold Dmin). This second notification indicates that the follower aircraft 302 has entered the wake vortex from the leader aircraft 301.

The controller 160 may also be configured so as to give such a notification in a first form (for example, a first type of sound or message) when the comparison shows that the value obtained in step 502 is greater than the predetermined first threshold and to give such a notification in a second form (for example, a second type of sound or message) when the comparison shows that the value obtained in step 502 is less than or equal to the predetermined first threshold.

The controller 160 may also be configured so as to give such a notification in a first form (for example, a first type of sound or message) when the comparison shows that the value obtained in step 502 is greater than the predetermined second threshold and to give such a notification in a second form (for example, a second type of sound or message) when the comparison shows that the value obtained in step 502 is less than or equal to the predetermined second threshold, or when the comparison shows that the value obtained in step 502 is greater than the predetermined first threshold and less than or equal to the predetermined second threshold.

The controller 160 may also be configured so as to give the first notification in a first form (for example, a first type of sound or message) when the comparison shows that the value obtained in step 502 is greater than the predetermined first threshold (and less than the predetermined second threshold) and to give the second notification in a second form (for example, a second type of sound or message) when the comparison shows that the value obtained in step 502 is greater than the predetermined second threshold. The notification in the first form therefore indicates that the follower aircraft 302 is approaching the wake vortex from the leader aircraft 301 (at a distance D less than the threshold Dmax), and the notification in the second form indicates that the follower aircraft 302 has entered the wake vortex from the leader aircraft 301 (at a distance D less than the threshold Dmin).

The algorithm then loops back to step 501.

According to another configuration, in step 503, the controller 160 compares the value obtained in step 502 with the predetermined first threshold, and when the value obtained in step 502 is greater than the predetermined first threshold, the controller 160 then compares the value obtained in step 502 with the predetermined second threshold. Then, in step 504, the controller 160 gives a first notification when the comparison shows that the value obtained in step 502 is greater than the predetermined first threshold and less than the predetermined second threshold, and the controller 160 gives a second notification, different from the first notification, when the comparison shows that the value obtained in step 502 is greater than the predetermined second threshold.

Figure 6:
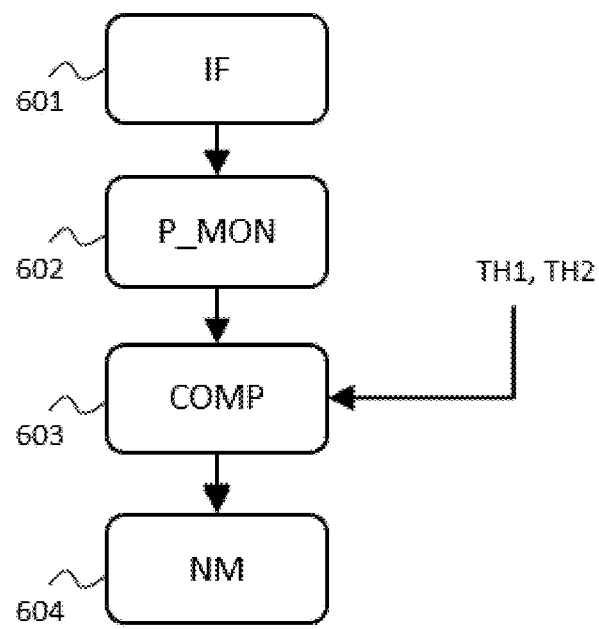
FIG. 6 schematically illustrates a hardware layout suitable for an implementation of the algorithm of FIG. 5.

FIG. 6 schematically illustrates a modular layout of the controller 160, in hardware and/or software form, suitable for an implementation of the algorithm of FIG. 5.

The controller 160 then comprises an interface IF 601 receiving acceleration measurements from an accelerometer 130. The accelerometer 130 in question may be one accelerometer 130 selected from among a plurality of accelerometers 130 installed on the follower aircraft 302.

The controller 160 also comprises a peak value monitor P_MON ("peak monitor") 602 that monitors the acceleration measurements received via the interface IF 601 and extracts therefrom a peak value over a time window of predefined duration (for example monitoring cycles or sliding window).

The controller 160 furthermore comprises a comparator COMP 603 taking, as first input, the peak value provided by the peak value monitor P_MON 602 and, as second input, a threshold value TH1 (predetermined first threshold) or TH2 (predetermined second threshold), and compares the first and second inputs.

The controller 160 also comprises a notification manager NM 604 in order to generate the notification outlined in step 504. For example, the notification manager NM 604 triggers an alert when the peak value provided by the peak value monitor P_MON 602 is greater than the threshold value TH1 or TH2.

Figure 7:
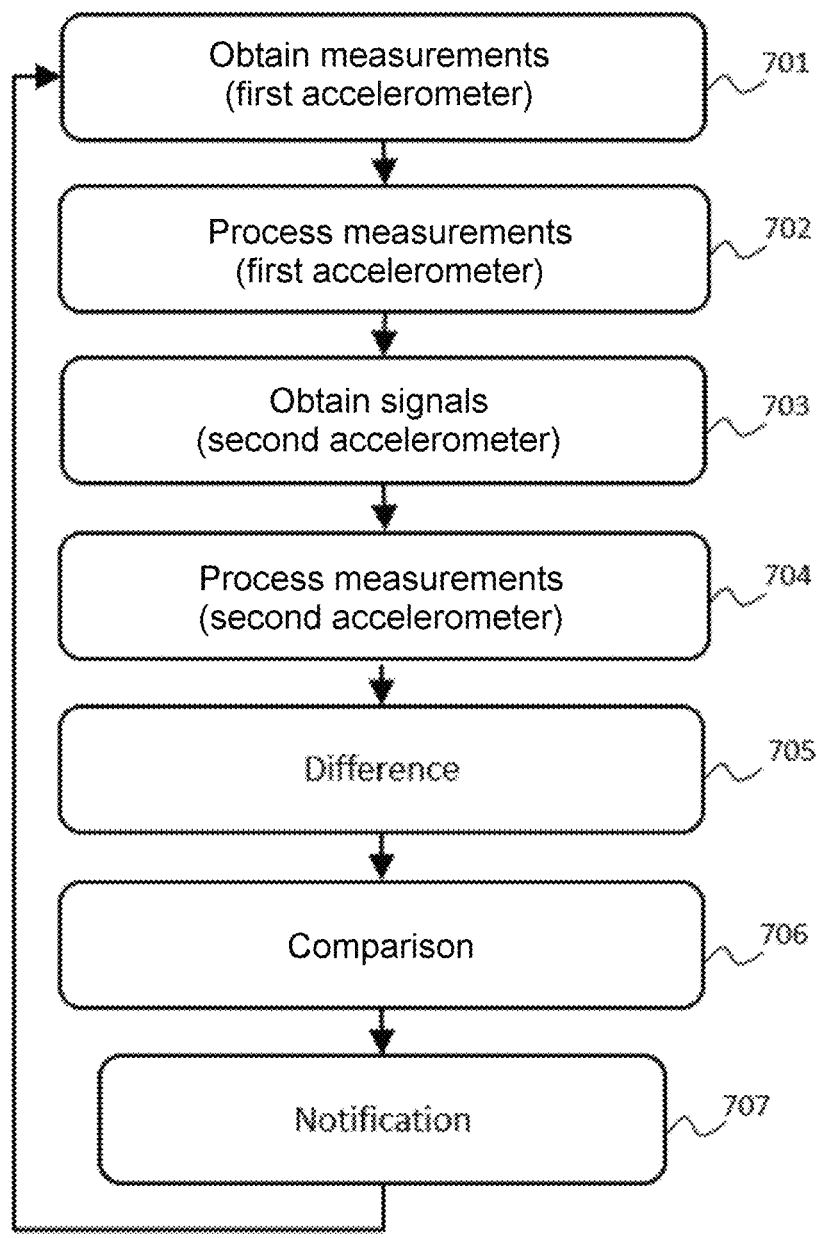
FIG. 7 schematically illustrates an algorithm for detecting excessive proximity of a wake vortex, according to a second embodiment.

FIG. 7 schematically illustrates an algorithm for detecting excessive proximity of a wake vortex based on measurements performed by a plurality of accelerometers 130. At least one accelerometer 130 is located on one wing and at least one accelerometer 130 is located on the other wing.

In a step 701, the controller 160 obtains acceleration measurements from at least one accelerometer 130 located on a wing of the follower aircraft 302. When multiple accelerometers 130 are located on this wing, the controller 160 may obtain a combination of measurements, for example using a weighted average, from the accelerometers 130.

In a step 702, the controller 160 processes the measurements received in step 701 so as to obtain therefrom a value representative of vibrations generated by a wake vortex from the leader aircraft 301. In one particular embodiment, the controller 160 determines a variance of the measurements received in step 701 over a time window. The controller 160 preferably determines a moving variance. In one particular embodiment, the controller 160 furthermore applies a filter, for example a noise suppression filter or interference suppression filter, to the measurements received in step 701.

In a step 703, the controller 160 obtains acceleration measurements from at least one accelerometer 130 located on the other wing of the follower aircraft 302. When multiple accelerometers 130 are located on this wing, the controller 160 may obtain a combination of measurements, for example using a weighted average, from the accelerometers 130.

In a step 704, the controller 160 processes the measurements received in step 703 so as to obtain therefrom a value representative of vibrations generated by a wake vortex from the leader aircraft 301. In one particular embodiment, the controller 160 determines a variance of the measurements received in step 703 over the same time window as in step 702. The controller 160 preferably determines a moving variance. In one particular embodiment, the controller 160 furthermore applies a filter, for example a noise suppression filter or interference suppression filter, to the measurements received in step 703.

In a step 705, the controller 160 determines a difference value between the values obtained in steps 702 and 704. Thus, in one particular embodiment, the controller 160 determines a variance difference value, over the abovementioned time window, between the values obtained in steps 702 and 704.

In a step 706, the controller 160 compares the difference value obtained in step 705 with a predetermined third threshold representative of excessive vibrations with regard to the location of the accelerometers 130 on the follower aircraft 302. This predetermined third threshold is representative of the fact that the follower aircraft 302 is approaching the wake vortex from the leader aircraft 301, at a distance D less than the threshold Dmax. For example, this third threshold is predefined and fixed in accordance with measurement readings taken during full-scale tests or in simulations.

According to another configuration, in a step 706, the controller 160 compares the difference value obtained in step 705 with a predetermined fourth threshold representative of excessive vibrations with regard to the location of the accelerometers 130 on the follower aircraft 302. The predetermined fourth threshold is greater than the predetermined third threshold. This predetermined fourth threshold is representative of the fact that the follower aircraft 302 has entered the wake vortex from the leader aircraft 301, at a distance D less than the threshold Dmin. For example, this fourth threshold is predefined and fixed in accordance with measurement readings taken during full-scale tests or in simulations.

In a step 707, the controller 160 gives a notification based on the result of step 706, using the same principle as in step 504.

The algorithm then loops back to step 701.

The algorithms of FIGS. 5 and 7 may be executed on their own or in parallel.

Figure 8:
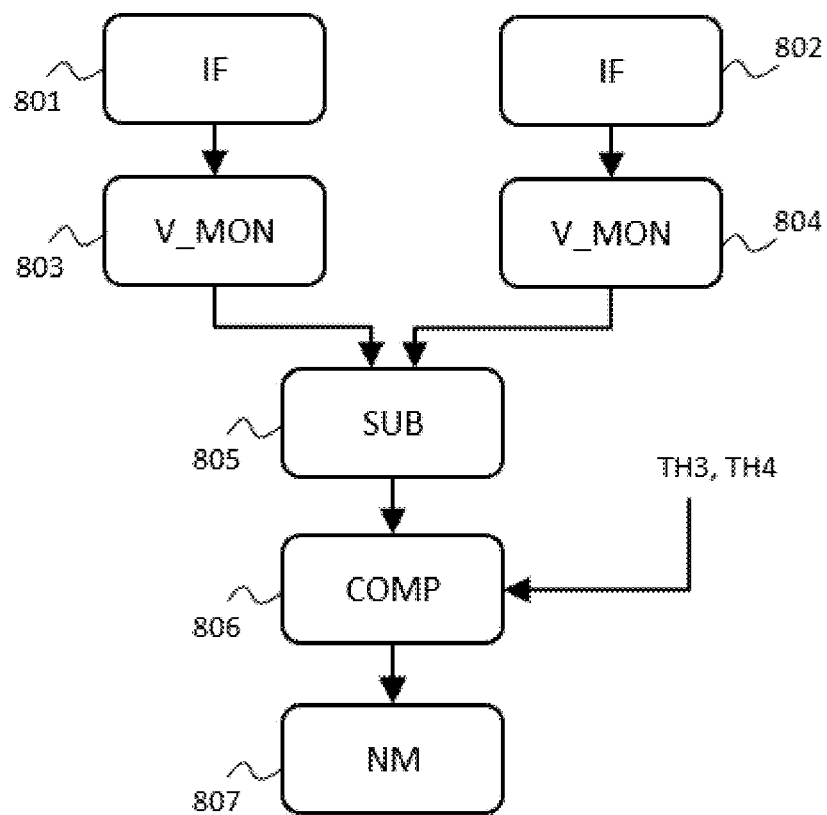
FIG. 8 schematically illustrates a hardware layout suitable for an implementation of the algorithm of FIG. 7.

FIG. 8 schematically illustrates a modular layout of the controller 160, in hardware and/or software form, suitable for an implementation of the algorithm of FIG. 7.

The controller 160 then comprises a first interface IF 801 receiving acceleration measurements from at least one accelerometer 130 located on one wing of the follower aircraft 302. The controller 160 also comprises a second interface IF 802 receiving acceleration measurements from at least one accelerometer 130 located on the other wing of the follower aircraft 302.

The controller 160 also comprises a variance value monitor V_MON ("variance monitor") 803 that monitors the measurements received via the first interface IF 801 and extracts therefrom a variance value, preferably moving variance value, over a time window (for example monitoring cycles or sliding window). The controller 160 also comprises another variance value monitor V_MON 804 for the measurements received via the second interface IF 802.

The controller 160 also comprises a subtractor SUB 805 taking, as first input, the variance value, preferably moving variance value, provided by the variance value monitor V_MON 803 and, as second input, the variance value, preferably moving variance value, provided by the variance value monitor V_MON 804, and calculates a difference value therefrom.

The controller 160 furthermore comprises a comparator COMP 806 taking, as first input, the difference value provided by the subtractor SUB 805 and, as second input, a threshold value TH3 (predetermined third threshold) or TH4 (predetermined fourth threshold), and compares the first and second inputs.

The controller 160 also comprises a notification manager NM 807 in order to generate the notification outlined in step 707. For example, the notification manager NM 807 triggers an alert when the variance difference value is greater than the threshold value TH3 or TH4.

The modular layouts of FIGS. 6 and 8 may be implemented on their own or in parallel.

The subject matter disclosed herein can be implemented in or with software in combination with hardware and/or firmware. For example, the subject matter described herein can be implemented in or with software executed by a processor or processing unit. In one exemplary implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method implemented by a system for aiding formation flying of a follower aircraft with respect to a wake vortex from a leader aircraft, the system for aiding formation flying comprising a controller and a plurality of accelerometers installed on the follower aircraft, the method comprising steps as follows, performed by the controller during flight of the follower aircraft:
receiving acceleration measurements performed by the plurality of accelerometers;
processing the received acceleration measurements to obtain therefrom a value representative of vibrations generated by the wake vortex from the leader aircraft;
comparing the obtained value with a predetermined threshold representative of excessive vibrations with regard to a location of each of the plurality of accelerometers on the follower aircraft; and
generating a notification when the comparison shows that the obtained value is greater than the predetermined threshold;
wherein the notification is a message sent to a flight command management system of the follower aircraft, the flight command management system making adjustments to a trajectory of the follower aircraft based on the message;
wherein the controller obtains information about the vibrations that determines whether the follower aircraft is located to a right of the leader aircraft or to a left of the leader aircraft.

2. The method of claim 1, wherein the controller performs steps of:
receiving acceleration measurements performed by the plurality of accelerometers;

extracting, from the received acceleration measurements, a peak value over a time window of predefined duration;

comparing the extracted peak value with the predetermined threshold; and generating the notification when the comparison shows that the extracted peak value is greater than the predetermined threshold.

3. The method of claim 1, wherein the controller performs steps of:

receiving acceleration measurements performed by the plurality of accelerometers; extract, from the received acceleration measurements, a variance value over a time window;

comparing the extracted variance value with the predetermined threshold; and generating the notification when the comparison shows that the extracted variance is greater than the predetermined threshold.

4. The method of claim 3, wherein each variance value is a moving variance value.

5. The method of claim 1, wherein:

the plurality of accelerometers comprises a first accelerometer and a second accelerometer; and the controller performs the steps of:

receiving first acceleration measurements performed by the first accelerometer, which is located on one wing of the follower aircraft;

extracting, from the received first acceleration measurements, a first variance value over a time window;

receiving second acceleration measurements performed by the second accelerometer, which is located on another wing of the follower aircraft;

extracting, from the received second acceleration measurements, a second variance value over the time window;

determining a difference value between the first and second variance values;

comparing the determined difference value with the predetermined with the predetermined threshold or another predetermined threshold; and generating the notification when the comparison shows that the determined difference value is greater than the predetermined second threshold, or, respectively, than the other predetermined threshold.

6. The method of claim 1, wherein the notification is an order to activate a light-based and/or sound-based signal in a cockpit of the follower aircraft.

7. A system for aiding formation flying of a follower aircraft with respect to a wake vortex from a leader aircraft, the system for aiding formation flying comprising a controller and a plurality of accelerometers installed on the follower aircraft, the controller comprising electronic circuitry configured, during flight of the follower aircraft, to:

receive acceleration measurements performed by the plurality of accelerometers;

process the received acceleration measurements to obtain therefrom a value representative of vibrations generated by the wake vortex from the leader aircraft;

compare the obtained value with a predetermined threshold representative of excessive vibrations with regard to a location of each of the plurality of accelerometers on the follower aircraft; and generate a notification when the comparison shows that the obtained value is greater than the predetermined threshold;

wherein the notification is a message sent to a flight command management system of the follower aircraft, the flight command management system making adjustments to a trajectory of the follower aircraft based on the message;

wherein the controller obtains information about the vibrations that determines whether the follower aircraft is located to a right of the leader aircraft or to a left of the leader aircraft.

8. A follower aircraft in formation flying comprising the system for aiding formation flying of claim 7.

9. The follower aircraft of claim 8, wherein:

the flight command management system has at least one information source; and the system for aiding formation flying is independent of the at least one information source of the flight command management system.

10. The system of claim 7, wherein the controller performs steps of:

receiving acceleration measurements performed by the plurality of accelerometers;

extracting, from the received acceleration measurements, a peak value over a time window of predefined duration;

comparing the extracted peak value with the predetermined threshold; and generating the notification when the comparison shows that the extracted peak value is greater than the predetermined threshold.

11. The system of claim 7, wherein the controller performs steps of:

receiving acceleration measurements performed by the plurality of accelerometers; extract, from the received acceleration measurements, a variance value over a time window;

comparing the extracted variance value with the predetermined threshold; and generating the notification when the comparison shows that the extracted variance is greater than the predetermined threshold.

12. The system of claim 11, wherein each variance value is a moving variance value.

13. The method of claim 1, wherein the notification is an order to activate a light-based and/or sound-based signal in a cockpit of the follower aircraft and/or a message sent to a flight command management system of the follower aircraft.

\* \* \* \* \*